United States Patent [19]
Leddy

[11] 3,992,604
[45] Nov. 16, 1976

[54] ELECTRICALLY HEATED ICE CREAM DISPENSER

[76] Inventor: James H. Leddy, High Point Mountain Road, West Shokan, N.Y. 12494

[22] Filed: Oct. 3, 1974

[21] Appl. No.: 511,749

[52] U.S. Cl. .................................. 219/227; 30/140; 219/239; 219/533; 425/279
[51] Int. Cl.² ...................... H05B 1/00; B28B 1/00
[58] Field of Search .................. 219/221, 227–232, 219/236–242, 533; 30/140; 425/279, 282

[56] References Cited
UNITED STATES PATENTS

| | | | |
|---|---|---|---|
| 1,137,573 | 4/1915 | Carr .................................. | 219/236 |
| 1,732,076 | 10/1929 | Alderman et al. .................. | 219/236 |
| 1,732,502 | 10/1929 | Cox .................................... | 425/282 |
| 1,909,774 | 5/1933 | Lindsay .............................. | 219/240 |
| 1,974,051 | 9/1934 | Kelly .................................. | 219/228 X |
| 2,030,285 | 2/1936 | Dinyer ............................... | 219/239 |
| 2,114,703 | 4/1938 | Connor .............................. | 219/227 X |
| 2,283,343 | 5/1942 | Weiskopf ........................... | 30/140 |
| 2,304,559 | 12/1942 | Engesser ........................... | 219/228 UX |
| 2,452,259 | 10/1948 | Pabis .................................. | 219/238 |
| 2,468,818 | 5/1949 | Fox et al. ........................... | 219/239 |
| 2,569,250 | 9/1951 | Mims ................................. | 219/238 X |
| 2,715,175 | 8/1955 | Jacobson ........................... | 219/228 X |
| 3,299,838 | 1/1967 | Thietje .............................. | 219/227 UX |

*Primary Examiner*—A. Bartis

[57] ABSTRACT

An electrically heated dispenser for serving frozen desserts, such as ice cream, includes a handle having an electric heating element projecting from the forward end thereof. A removable protective shield at least coextensive in length with the heating element is carried by the forward end of the handle and surrounds the heating element in spaced relation thereto. The shield is made of a material sufficiently transparent to permit visual inspection of the sanitary condition of the area within the shield including the inner surface thereof. A variety of serving implements, such as a dipper, scoop, knife, etc., are adapted to have an end selectively inserted through a front opening on the shield into heat exchange coupled relationship with the heating element.

6 Claims, 6 Drawing Figures

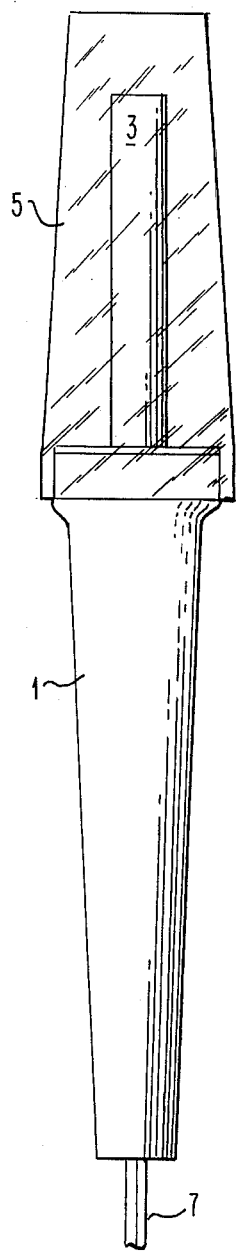
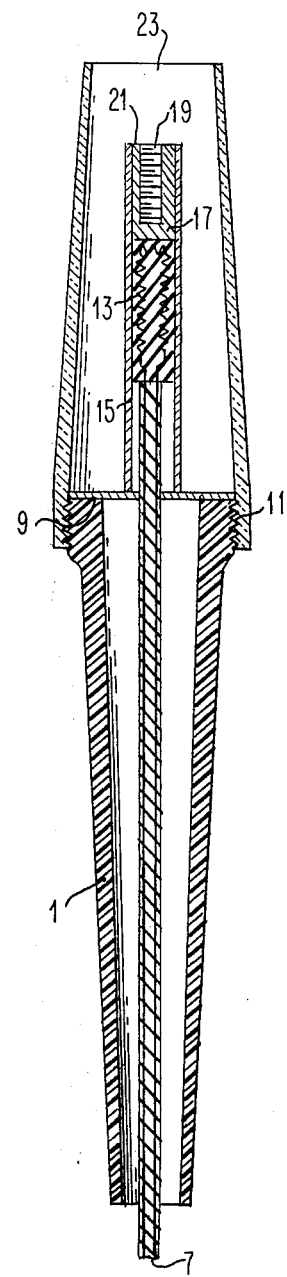
FIG. 1
FIG. 2

ELECTRICALLY HEATED ICE CREAM DISPENSER

BACKGROUND OF THE INVENTION

This invention relates generally to a device for handling frozen desserts such as various forms of ice cream, ices, sherberts, and the like, and more particularly to a universal utensil having a plurality of attachments adapted for preparing individual servings of such foods.

With the proliferation of freezers and improved packaging of bulk ice cream, the use of frozen foods such as ices, sherberts, and ice cream products in various forms as a dessert both in homes, fountains, restaurants, cafeterias, hospitals or the like is constantly rising. While the instant invention may be employed with various frozen foods, it will be described with respect to ice cream products and primarily concerned with home consumption. One of the major problems relates to serving ice cream in the frozen state. If removed from a freezer before serving, the ice cream tends to soften or melt and when refrozen the water content becomes icy. In attempting to serve ice cream directly in the frozen state, the conventional ice cream scoop or ladle is generally unable to penetrate the ice cream, particularly when the congealed mass is frozen to a hardened consistency. A particular difficulty relates to preparing individual servings of ice cream cake or pie which when solidly frozen cannot be cut with a conventional knife. This problem probably represents a major factor in the failure of these desserts to increase in popularity.

One solution to the problem of the freezing and consequent adherence of the congealed mixture to the bowl of the dispensing device is to maintain the ice cream scoops or ladles in hot water wells to maintain the temperature of the dispenser above that of the ice cream. However, in addition to the risk of contamination, provision must be made to maintain the water in the wells hot, and the temperature of the dispensing device drops immediately when submerged in a container of frozen ice cream. Additionally, the moisture in the dispenser when refrozen in the ice cream tends to create ice which detracts from the creamy composition of the ice cream. The problem of handling frozen ice cream cakes or pies is particularly acute, since it is obviously undesirable to attempt to store a knife in a hot water solution and, even if so stored, the cutting effect would be only momentary before the temperature of the knife blade dropped below that necessary to cut the cake or pie due to contact with the frozen mass. Thus a many pronged problem relating to the dispensing and serving of various forms of ice cream as frozen desserts particularly for home consumption is limiting the growth and continued use of a highly favored dessert.

In dispensing frozen desserts, it is necessary to provide a dispensing device which is capable of being heated and retaining heat so that when submerged in a container of frozen ice cream, the dispenser will be enabled to penetrate the ice cream and the ice cream will not adhere to the inner wall of the dispenser. Various attempted solutions to this problem are known in the art. Such solutions include a double wall dispensing device to permit fluid to circulate therethrough in heat transfer relation to the inner surface of the dispenser. Such devices which circulate heated liquids or solutions having a low freezing point are commonly employed for transferring frozen ice cream from a storage receptacle to individual serving dishes. However, these dispensers are relatively complex and expensive. Sine they are normally limited to a single dispenser and thus represent only a partial solution, they are impractical for the home consumption market.

SUMMARY OF THE INVENTION

In accordance with the present invention, there is provided a universal ice cream dispenser which is adapted to provide ice cream servings directly from a frozen container or individual servings of frozen ice cream cake or pie. The device includes a handle having an associated heating element, with means for attaching a variety of dispensing devices thereto in accordance with the form of the frozen dessert to be dispensed. Such dispensing devices include an ice cream scoop an, ice cream ladle for dispensing bulk ice cream, and a heated knife for providing servings of frozen ice cream in cake or pie form. By means of the instant invention, the container and particular form of dessert will dictate the dispenser to be utilized, which is then rapidly heated and used to scoop or ladle the frozen ice cream, or cut the ice cream cake or pie. The appliance can be maintained at the higher temperature for the serving period including permanently, if desired, and then disconnected, the dispenser removed, and stored until the next use. The device is further designed to facilitate cleaning. By utilizing a variety of utensils such as indicated above, ice cream in any form or container can be processed for serving either in private or commercial quantities. The dispensing or serving utensils are heated by direct contact with the heating element positioned adjacent to the handle assembly, as compared to fluid circulation through a hollow dispenser as known in the art. In addition, the heated knife assembly may also be utilized to cut other frozen food rapidly and cleanly. By means of the single handle assembly including the heating element and common attachment feature of the instant invention, a variety of dispensing or serving devices adapted to dispense or serve any form of frozen dessert can be provided at a reasonable cost.

Accordingly, a primary object of the present invention is to provide a frozen dessert dispensing device having a common heating unit adapted to accommodate a plurality of ice cream preparing or dispensing devices.

Another object of the present invention is to provide a hot scoop-hot knife frozen dessert dispenser having a common handle and heating assembly and adapted to heat a scoop or knife preparation or dispensing devices.

Still another object of the present invention is to provide an improved ice cream serving apparatus adapted to dispense hard frozen ice cream utilizing a common handle heating assembly and a variety of ice cream dispensing device to accommodate a wide range of frozen desserts.

BRIEF DESCRIPTION OF THE DRAWINGS

FIG. 1 is a plan view of the universal handle and heating assembly of the instant invention.

FIG. 2 is a sectional view of the assembly shown in FIG. 1.

DETAILED DESCRIPTION OF A PREFERRED EMBODIMENT

Figure 3:
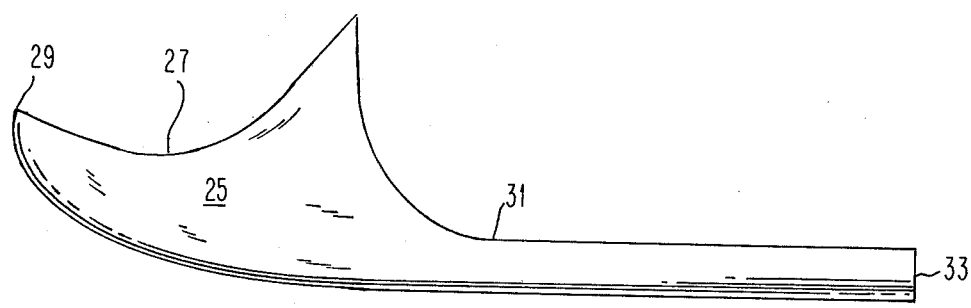
FIG. 3 is a plan view of the ice cream scoop dispenser.

Referring now to the drawings and more particularly to FIG. 1 thereof, there is illustrated a plan view of a preferred embodiment of the universal handle and heater assembly adapted to selectively accommodate a variety of dispensing or serving devices. The handle 1 in the preferred embodiment is a conical configuration and is made of a moulded plastic material. A heating element 3 extends beyond the handle, and a protective transparent cover 5 formed from a heat resistant moulded plastic material is also conically shaped but with a reverse taper connected to the handle 1. As shown and more fully described hereinafter, an electric cord 7 connects to the heating element 3. The cover member 5 functions to prevent direct contact with heating element 3. While specific handle and protective covering configurations are illustrated in FIG. 1, it is apparent that these merely represent design considerations, and any conventional handle configuration such as those employed with various electrical carving knives or similar devices can be used.

Referring to FIG. 2 for details of the handle and heater construction, the handle 1 has a wall construction which is hollow at both ends. The handle is threaded as its lateral end 9, while the mating threaded member 11 of the cover 5 is adapted for securing the cover to the handle as well as for rapidly disassembling the two members for cleaning or servicing. The heating element 3 contains a heating coil 13 to which the two conductors of cord 7 are connected. The heating coil is electrically insulated from the heater wall 15 by conventional electrical insulation material in the manner recommended by standard underwriter practice to eliminate the problem of electrical shock. Likewise, as illustrated, the electrical cord is electrically insulated within the heating element 3 and in fact along its entire length to prevent contact of the conductors with the heater element 3. However, the heating coil 13 is not thermally insulated from the heater walls since the walls are heated and the heat then conducted to the individual dispensing element. This form of heating is known in the art, and represents a technique employed with certain types of soldering irons. A thermostat (not shown) may be introduced into the device to maintain the temperature of the heating element at any desired temperature.

The end of the heater element 13 to which the individual handling appliances are connected has a solid portion 17 with a threaded female connector 19 running inwardly from edge 21 and adapted to connect to a threaded male element and conduct heat directly thereto. Any excess heat generated by the heater element will be radiated from the cover outlet 23 of cover member 5 and thus will not affect the user. While a specific form of heater and connection to the individual dispenser elements has been shown and described relative to the preferred embodiment, it will be appreciated that these are merely illustrative of techniques which may be employed, and any manner of direct heating of the individual ice cream handling utensils and connection between such utensils and a common handle and heating member are comtemplated within the scope of the instant invention.

Referring now to FIG. 3, there is illustrated a plan view of a preferred ice cream scoop or dipper. The conventional spherical ice cream dispenser provides a large surface area relative to the scoop dispensed, thus requiring more heat to heat a larger area, and it is difficult to manipulate such scoops within ice cream, particularly when frozen to a substantially hardened composition. The scoop of the instant invention employs a modified bowl 25 having a thin walled upper surface 27 and a relatively sharp edge 29 for scooping purposes. The bowl is connected to a bowl extension 31, the end 33 of which connects to the handle heating element assembly in a manner to be described. The bowl 25 may be made as a single integral member of any heat conducting material such as aluminum, steel alloy, or zinc alloy.

Scoop 25 is capable of being heated and retaining heat so that when submerged in a container of frozen ice cream, the ice cream will not adhere to the inner wall of the scoop thereby permitting unrestricted discharge of the ice cream into a receptacle, dish or cone. In using the scoop to dispense ice cream, it will normally be held in a near vertical position so that the forward edge 29 of the heated scoop will be first moved into the frozen material, the sharp edge assisting the heated bowl into rolling a body of cream into the bowl of the scoop.

Figure 4:
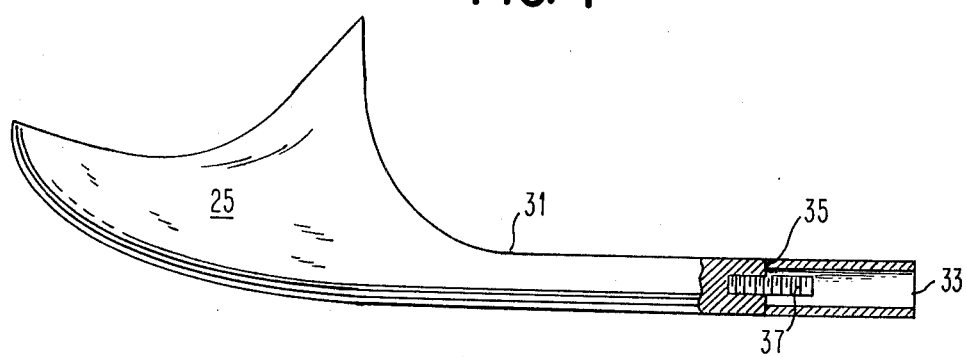
FIG. 4 is a view partly in section of the ice cream scoop dispenser.

Referring briefly to FIG. 4, the ice cream scoop is illustrated in section to clarify the manner of connecting the scoop to the universal handle-heating element assembly. The bowl extension 31 terminates in a hollow portion between points 33, 35 and a threaded male contact 37 in the inner portion of the scoop handle is adapted for connection to the corresponding threaded female connector 19 of FIG. 2. By rotating the scoop 25 the maximum distance, the male connector 37 is firmly attached to female connector 19 (FIG. 2), the scoop is firmly connected to the handle-heater assembly, and conductively connected to transfer heat from heater coil 13 through connectors 19, 37 to the ice cream scoop 25. It should be noted that while a threaded connector arrangement is illustrated in the preferred enbodiment, any alternative connecting arrangement to provide a good thermal connection between the heating coil and the individual utensil, such as a snap-in connector, may be employed.

Figure 5:
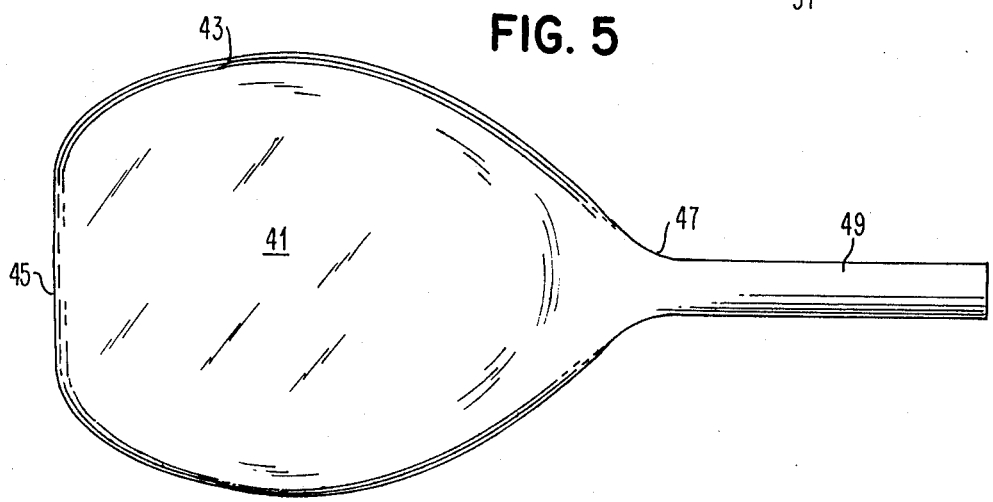
FIG. 5 is a top plan view of the ice cream ladle dispenser.

Referring now to FIG. 5, there is illustrated a top plan view of a preferred embodiment of a ladling spoon 41 construced in accordance with the present invention. Since the handle 49 is identical to that shown in FIGS. 3 and 4, only a single view is necessary. The head portion 43 of the ladling spoon is of conventional construction, having a forward cutting edge 45, a heel portion, and a handle portion 49, the ladling spoon being adapted for insertion into the handle. While the spoon 41 could be made in various sizes for packaging ice cream or the like, the preferred embodiment would be a single size suitable for home use. The surfaces of the scoop are smooth, and the spoon would be constructed of a heat conducting metal or alloy such as used in the scoop of FIGS. 3, 4. In addition to serving dishes of ice cream, the ladle of FIG. 5 could be used for ice cream cones by placing the body of ice cream in the cone and rotating the spoon to give a smooth conical appearance.

One of the limitations relating to serving frozen desserts is the lack of any suitable means for preparing servings of frozen desserts such as ice cream pies and cakes. There are no conventional modes of serving such desserts, since they can only be effectively cut by conventional cutlery. Since home refrigeration or freezers do not have the necessary controls to maintain these desserts at a temperature suitable for cutting and serving, it is necessary to leave them at room or refrigerated temperatures until sufficiently softened to cut, and then refreeze the remainder. This is undesirable since refreezing often changes the consistency of the cream. However, by an auxiliary cutting element, which is also adapted for heating, the present invention solves the problem and permits cutting the frozen cake or pie directly from the freezer whenever desired. Since the efficiency of this knife in cutting frozen desserts is more a function of the heat than the sharpness, the knife need not be extremely sharp or pointed, so that handling of the blade does not constitute a safety hazard.

Figure 6:
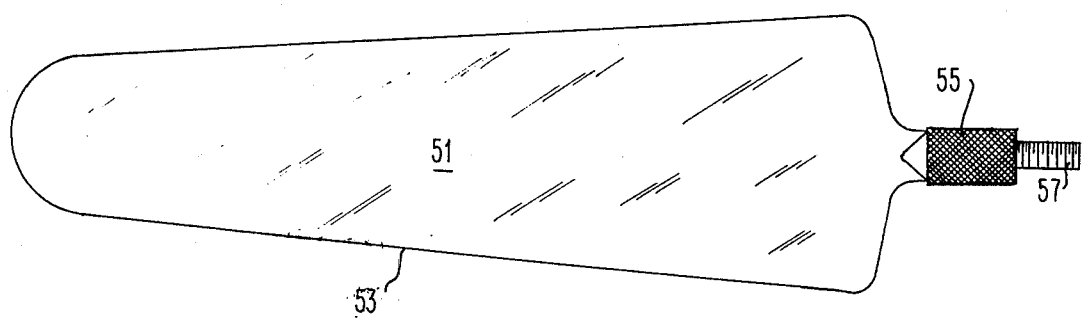
FIG. 6 is a top plan view of a cutting blade adapted when connected to said handle-heating assembly for cutting frozen desserts such as ice cream cakes or pies.

Referring to FIG. 6, the knife blade 51 has a cutting edge 53 on its lower extremity, although both edges could be made identical. While not necessarily very sharp for reasons noted above, it could be sharpened and/or serrated at its cutting edge 53 to cut other frozen products such as vegetables, fruits, etc. The knife blade would be made of a heat conducting metal or alloy such as those previously described. The blade is terminated at a brazed terminal 55, which may be brass or a similar alloy. In the preferred embodiments herein described, the blade 51 has a threaded connector 57, which is also adapted for coupling directly to the female connector 19 of FIG. 2. Alternatively, a handle and coupling arrangement similar to that used in the ice cream scoop and ladle shown and described above could be employed.

In summary, the instant invention provides a practical and novel arrangement for handling any form of frozen dessert, and by a unique arrangement requiring only a single heating assembly, can be manufactured at a price suitable for home consumption. The basic dispensing device described above can accommodate any form of frozen dessert, and the construction permits rapid dissembly for cleaning purposes.

While the invention has been shown and described with reference to a preferred embodiment thereof, it will be understood by those skilled in the art that other changes in form and detail may be made therein without departing from the spirit and scope of the invention.

What is claimed is:

1. A frozen dessert ladling device comprising, in combination, a handle heating element assembly,
    said assembly comprising a handle member, an electric heating element projecting from the forward end of said handle, and a protective shield carried by said end of said handle member and surrounding said heating element in spaced relation thereto,
    said shield being at least coextensive in length with the exposed portion of said heating element so as to shield the entire length thereof, and having an open front end to provide access to the heating element in said shield,
    said shield member being made of material sufficiently transparent to permit visual inspection of the sanitary condition of the area within said shield member including the inner surface thereof,
    a ladling implement, and
    means for removably attaching said ladling implement to said heating element in heat exchange relationship therewith whereby heat is conducted from said heating element to said ladling implement, said ladling implement extending outwardly through said open end of said shield.
2. A device of the type claimed in claim 1 wherein said protective shield is detachable from said handle member to facilitate cleaning.
3. A device of the type claimed in claim 2 wherein said protective shield is adapted to dissipate excessive heat from said heating element through the open front thereof in a direction away from said handle member.
4. A device of the type claimed in claim 1 wherein said ladling implement comprises an ice cream dipper.
5. A device of the type claimed in claim 1 wherein said ladling implement comprises an ice cream scoop.
6. A device of the type claimed in claim 1 wherein said ladling implement comprises a knife adapted when heated to cut frozen foods.

* * * * *